(12) United States Patent
Fujine et al.

(10) Patent No.: US 8,232,956 B2
(45) Date of Patent: Jul. 31, 2012

(54) LIQUID CRYSTAL DISPLAY APPARATUS

(75) Inventors: Toshiyuki Fujine, Sakura (JP); Seiji Kohashikawa, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

(21) Appl. No.: 12/064,580

(22) PCT Filed: Oct. 16, 2006

(86) PCT No.: PCT/JP2006/320540
§ 371 (c)(1),
(2), (4) Date: Feb. 22, 2008

(87) PCT Pub. No.: WO2007/046319
PCT Pub. Date: Apr. 26, 2007

(65) Prior Publication Data
US 2009/0146941 A1   Jun. 11, 2009

(30) Foreign Application Priority Data

Oct. 18, 2005  (JP) ................................. 2005-302923
Oct. 4, 2006   (JP) ................................. 2006-273073

(51) Int. Cl.
    *G09G 3/36*  (2006.01)
(52) U.S. Cl. .................... 345/102; 345/690; 345/204
(58) Field of Classification Search .......... 345/204–215, 345/690–699, 87–104
See application file for complete search history.

(56) References Cited

U.S. PATENT DOCUMENTS

| | | | |
|---|---|---|---|
| 5,748,257 A | 5/1998 | Kawabata et al. | |
| 6,795,053 B1 | 9/2004 | Funamoto et al. | |
| 7,151,572 B2 * | 12/2006 | Shirahama et al. | 348/554 |
| 2002/0067332 A1 * | 6/2002 | Hirakata et al. | 345/102 |
| 2003/0146919 A1 | 8/2003 | Kawashima et al. | |
| 2003/0233656 A1 * | 12/2003 | Sie et al. | 725/46 |
| 2004/0257318 A1 | 12/2004 | Itoh | |
| 2005/0017990 A1 | 1/2005 | Yoshida | |
| 2005/0231457 A1 | 10/2005 | Yamamoto et al. | |
| 2006/0058925 A1 * | 3/2006 | Diederiks et al. | 700/291 |
| 2006/0221260 A1 | 10/2006 | Fujine et al. | |

FOREIGN PATENT DOCUMENTS

| | | |
|---|---|---|
| EP | 1865488 A1 | 12/2007 |
| JP | 5-224641 A | 9/1993 |
| JP | 7-288751 A | 10/1995 |
| JP | 8-201812 A | 8/1996 |

(Continued)

*Primary Examiner* — Alexander Eisen
*Assistant Examiner* — Cory Almeida
(74) *Attorney, Agent, or Firm* — Birch, Stewart, Kolasch & Birch, LLP

(57) ABSTRACT

A video with a display definition most suitable for the type of the video content to be displayed can be displayed. A liquid crystal display apparatus controls the luminance of the backlight light source according to the APL of the video signal measured by an APL measuring portion (16). The range of the video signal the APL of which is measured can be determined by, e.g., the luminance level of the video signal or by the genre information included in the inputted video signal or the OSD display information used when the liquid crystal apparatus (1) performs OSD display. The drawing shows the state that the upper and lower non-video areas are removed and an effective video area is determined. With this, the additional information displayed when the video signal is of a specific genre and the OSD-displayed additional information can be excluded, and the luminance of the backlight light source can be controlled to realize a display definition most suitable for the video signal.

7 Claims, 11 Drawing Sheets

FOREIGN PATENT DOCUMENTS

| | | |
|---|---|---|
| JP | 3215400 B1 | 7/2001 |
| JP | 2003-36063 A | 2/2003 |
| JP | 03/038799 A1 | 5/2003 |
| JP | 2004-85961 A | 3/2004 |
| JP | 2004-258669 A | 9/2004 |
| JP | 2004-354882 A | 12/2004 |
| JP | 2005-258404 A | 9/2005 |
| JP | 2005-346032 A | 12/2005 |

* cited by examiner

FIG. 4

| NEWS/REPORT | SPORT | INFOR-MATION/TABLOID SHOW | DRAMA | MUSIC | VARIETY | MOVIE | CARTOON/SPECIAL EFFECTS | DOCUMEN-TARY/CULTURE | STAGE/PERFOR-MANCE | HOBBY/EDUCA-TION | WELFARE | ADDITION | EXPAN-SION | OTHERS |
|---|---|---|---|---|---|---|---|---|---|---|---|---|---|---|

| MAJOR CATEGORIES OF GENRES | MEDIUM CATEGORIES OF GENRES | DESCRIPTION |
|---|---|---|
| 0x0 | * | NEWS/REPORT |
| 0x0 | 0x0 | REGULAR/GENERAL |
| 0x0 | 0x1 | WEATHER |
| 0x0 | 0x2 | SPECIAL/DOCUMENTARY |
| 0x0 | 0x3 | POLITICS/DIET |
| 0x0 | 0x4 | ECONOMY/MARKET |
| 0x0 | 0x5 | FOREIGN/INTERNATIONAL |
| 0x0 | 0x6 | ANALYSIS |
| 0x0 | 0x7 | DEBATE/INTERVIEW |
| 0x0 | 0x8 | SPECIAL REPORT |
| 0x0 | 0x9 | LOCAL/COMMUNITY |
| 0x0 | 0xA | TRAFFIC |
| 0x0 | 0xB | |
| 0x0 | 0xC | |
| 0x0 | 0xD | |
| 0x0 | 0xE | |
| 0x0 | 0xF | OTHERS |
| | | |
| 0x1 | * | SPORT |
| 0x1 | 0x0 | SPORT NEWS |
| 0x1 | 0x1 | BASEBALL |
| 0x1 | 0x2 | SOCCER |
| 0x1 | 0x3 | GOLF |
| 0x1 | 0x4 | OTHER BALL SPORTS |
| 0x1 | 0x5 | SUMO/FIGHTING SPORT |
| 0x1 | 0x6 | OLYMPICS/INTERNATIONAL CONVENTION |
| 0x1 | 0x7 | MARATHON/ATHLETICS/SWIMMING |
| 0x1 | 0x8 | MOTOR SPORT |
| 0x1 | 0x9 | MARINE/WINTER SPORT |
| 0x1 | 0xA | HORSE RACE/PUBLIC RACE |
| 0x1 | 0xB | |
| 0x1 | 0xC | |
| 0x1 | 0xD | |
| 0x1 | 0xE | |
| 0x1 | 0xF | OTHERS |

LIQUID CRYSTAL DISPLAY APPARATUS

TECHNICAL FIELD

The present invention relates to a liquid crystal display apparatus and, more particularly, to a liquid crystal display apparatus that dynamically changes luminance of a backlight light source depending on a video signal.

BACKGROUND OF THE INVENTION

For a liquid crystal display apparatus including a liquid crystal panel that modulates light-source light in accordance with a video signal and a light source such as a backlight for applying light to the liquid crystal panel, technologies have been proposed to improve quality of display video by controlling the emission luminance of the backlight light source depending on a video signal.

For example, a patent document 1 and a patent document 2 have proposed those capable of displaying high-quality moving picture with sharp contrast (with dynamic contrast augmented) by detecting an average picture level (APL) as a feature quantity of an input video signal, reducing the emission luminance when the detected average picture level is high, and increasing the emission luminance when the level is low to differentiate the screen luminance even though the video is displayed at the same gradation level and dynamically change the screen luminance depending on displayed video contents.

With regard to such a technology that uses a feature quantity of an input video signal to control the emission luminance of the backlight light source, for example, Japanese Patent Application No. 2005-39959 (filed on May 6, 2004) filed by the same applicant as that of the present application describes an image display device capable of reducing effects of undesirable additional information as much as possible to constantly acquire the optimum screen luminance. This image display device includes a liquid crystal panel that uses a backlight light source to display an input video signal, a feature-quantity detecting means that detects a feature quantity of an input video signal, and a light-source controlling means that dynamically and variably controls the emission luminance of the backlight light source based on the feature quantity detected by the feature-quantity detecting means.

The feature-quantity detecting means extracts a video signal of a predetermined area in a screen to detect a feature quantity of the extracted video signal. This enables the effects of the undesirable additional information included in the input video signal to be reduced as much as possible to acquire the optimum screen luminance (brightness) depending on original video contents.

Patent Document 1: Japanese Laid-Open Patent Publication No. 8-201812
Patent Document 2: WO03/38799

DISCLOSURE OF THE INVENTION

Problems to be Solved by the Invention

If the emission luminance of a backlight light source is controlled depending on an input video signal as described above, the optimum brightness control characteristics must be selected in consideration of the visual perception of the human eye. In this regard, for example, in video signals, additional information such as captions, scores in sport casting, or channel information displayed by OSD (On Screen Display) has different luminance as compared to original video.

When the emission luminance of the backlight light source is controlled depending on a feature quantity of a video signal as described above, if a feature quantity of a video signal is detected with the above additional information included, the feature quantity is affected by the different luminance of the additional information and is not equivalent to a feature quantity of the original video signal. Therefore, the emission luminance is not optimized in the backlight light source depending on the feature quantity and the quality of display video may not sufficiently be improved.

To such a problem, as in above Japanese Patent Application No. 2005-39959, a video signal in a desirable area may selectively be extracted to eliminate effects of undesirable additional information.

However, the above technology is intended to set the predetermined area of the video signal for calculating the feature quantity in accordance with user's instruction input and is not intended to determine a feature of video to be displayed to automatically extract the predetermined area and to use a feature quantity of a video signal in the automatically extracted predetermined area to control the emission luminance of the backlight light source.

The present invention was conceived in view of the above situations and it is therefore the object of the present invention to provide a liquid crystal display apparatus that implements video display with the optimum display quality by automatically extracting a screen area for measuring a feature quantity of a video signal depending on video to be displayed, by obtaining the feature quantity from the video signal in the extracted screen area, and by controlling the emission luminance of the backlight light source depending on the feature quantity.

Means for Solving the Problems

To solve the above problem, a first technical means of the present invention is a liquid crystal display apparatus comprising a liquid crystal panel that displays video in accordance with an input video signal and a light source that applies light to the liquid crystal panel, the liquid crystal display apparatus controlling the emission luminance of the light source based on a feature quantity of the input video signal, the liquid crystal display apparatus automatically and variably controlling a screen area of a video signal for measuring the feature quantity depending on the video displayed on the liquid crystal panel.

A second technical means is the first technical means wherein a non-video area included in the video signal is excluded from the screen area for detecting the feature quantity.

A third technical means is the second technical means wherein a luminance signal of the video signal is compared with a predetermined threshold value to detect a video area lower than the threshold value as the non-video area.

A fourth technical means is any one of the first to third technical means wherein the screen area for measuring the feature quantity is determined based on genre information of the video displayed on the liquid crystal panel.

A fifth technical means is a fourth technical means wherein an area likely to display additional information added to the original video signal is excluded from the screen area for measuring the feature quantity based on the genre information.

A sixth technical means is any one of the first to fifth technical means wherein when OSD information is displayed, an area displaying the OSD information is excluded from the range for measuring the feature quantity.

A seventh technical means is any one of the first to sixth technical means wherein when a plurality of screens of video is concurrently displayed on one screen, a non-video area inevitably generated due to a screen configuration is excluded from the range for measuring the feature quantity.

An eighth technical means is any one of the first to seventh technical means wherein at least an average picture level per frame of the input video signal is used as the feature quantity of the input video signal.

A ninth technical means is any one of the first to eighth technical means wherein the input video signal is extended and compressed while the emission luminance of the light source is controlled.

A tenth technical means is any one of the first to eighth technical means wherein gradation conversion characteristics for the input video signal are changed while the emission luminance of the light source is controlled.

Effect of the Invention

According to the present invention, video display can always be achieved with the optimum display quality without cumbersome user setting operations by automatically and variably controlling a screen area for measuring a feature quantity of a video signal depending on video to be displayed.

BRIEF DESCRIPTION OF THE DRAWINGS

FIG. 4 is a view of an example of genre codes defined by the digital broadcast standard.

EXPLANATION OF REFERENCE NUMERALS

1 . . . liquid crystal display apparatus; 11 . . . antenna; 12 . . . tuner; 13 . . . decoder; 14 . . . letter-size detecting portion; 15 . . . gate portion; 16 . . . APL measuring portion; 17 . . . filter; 18 . . . backlight controlling portion; 19 . . . backlight or backlight unit; 20 . . . video processing portion; 21 . . . LCD controller; 22 . . . liquid crystal panel; 23 . . . microcomputer; 24 . . . table storage memory; 25 . . . luminance conversion table; 26 . . . multiplier; 27 . . . remote controller light-receiving portion; 30 . . . housing; 31 . . . fluorescent tube; 32 . . . diffusion plate; 41 . . . red light source; 42 . . . green light source; 43 . . . blue light source; 100 . . . effective video area; and 101 . . . non-measurement range.

PREFERRED EMBODIMENTS OF THE INVENTION

According to an embodiment of a liquid crystal display apparatus according to the present invention, an average picture level (APL; Average Picture Level) per frame of an input video signal is used as a feature quantity of the input video signal to control the emission luminance of a backlight light source depending on changes in the APL. In this case, the liquid crystal display apparatus retains a luminance conversion table defining the luminance conversion characteristics and controls the emission luminance of the backlight light source in accordance with the luminance control characteristics of the luminance conversion table.

According to the embodiment of the liquid crystal display apparatus according to the present invention, an APL measurement area used for controlling the emission luminance of the backlight light source is automatically extracted from a feature of a video signal, and the APL measured from the video signal in the extracted area is used to control the emission luminance of the backlight light source in accordance with the luminance control characteristics of the luminance conversion table.

The screen area of the video signal for measuring the APL is automatically and variably controlled depending on video displayed on a liquid crystal panel. For example, the screen area may be determined by determining an effective area of the video signal with the use of a predetermined index such as a luminance value of the video signal, or may be determined based on genre information included in the input video signal or OSD display information when the liquid crystal display apparatus performs OSD display. This can eliminate an area of a non-video portion, additional information displayed in the case of a video signal of a certain genre, or additional information at the time of OSD display from the screen area for measuring the APL. This enables the emission luminance of the backlight light source to be controlled such that the optimum display quality can be acquired depending on the video displayed on the screen.

Figure 1:
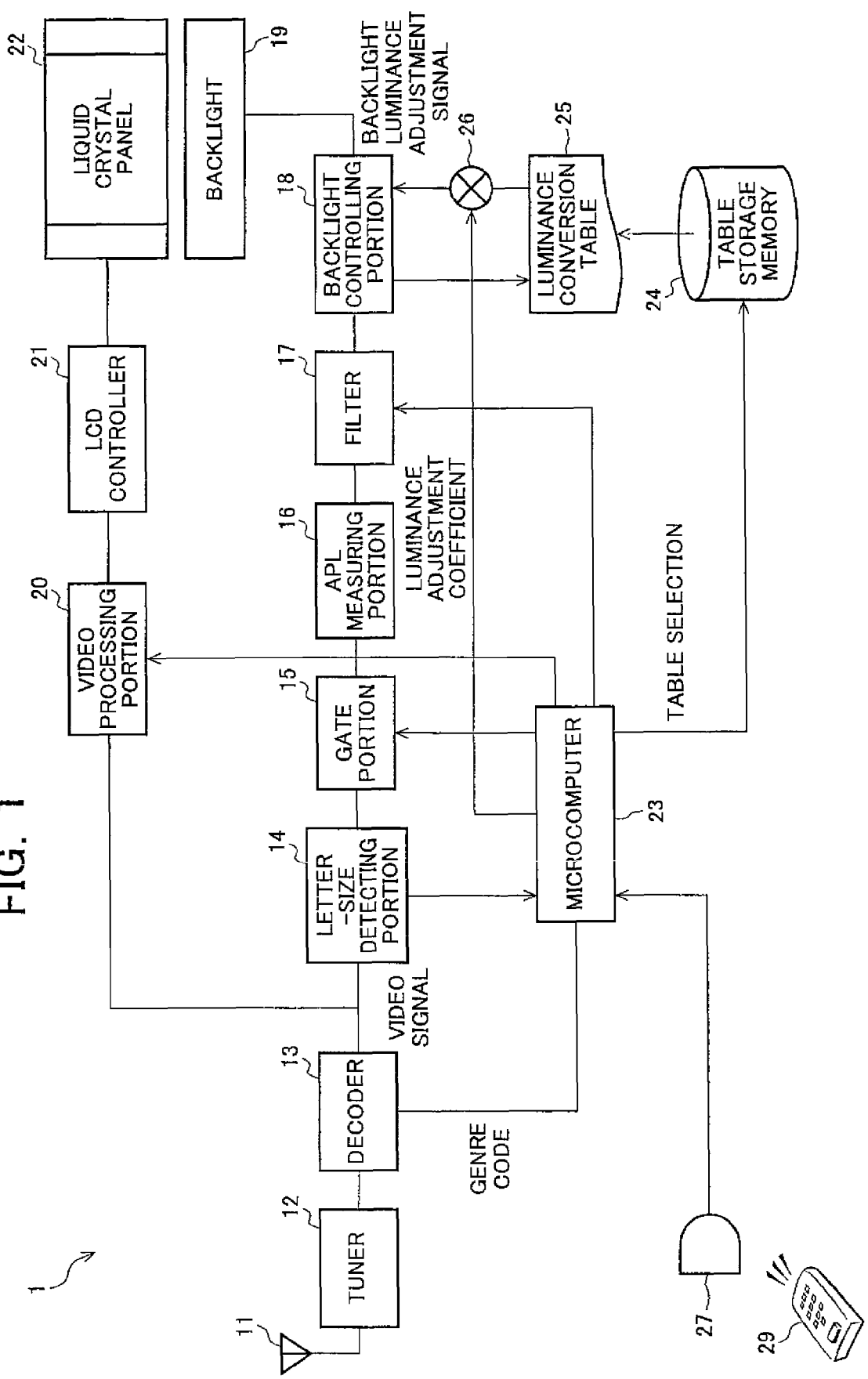
FIG. 1 is a block diagram for explaining a configuration of one embodiment of a liquid crystal display apparatus according to the present invention.

FIG. 1 is a block diagram for explaining a configuration of one embodiment of a liquid crystal display apparatus according to the present invention. In a liquid crystal display apparatus 1, a tuner 12 selects a broadcast signal received by an antenna 11. A decoder 13 demultiplexes the broadcast signal selected by the tuner 12 with a decode process and outputs a video signal for driving a liquid crystal panel 22 and genre information included in electronic program guide information, etc., of the broadcast signal.

The video signal demultiplexed by the decoder 13 is subjected to various video processes by a video processing portion 20 and is then input to an LCD controller 21 driving and controlling the liquid crystal panel 22. The LCD controller 21 outputs a liquid crystal drive signal to a gate driver and a source driver not shown of the liquid crystal panel 22 based on the input video signal, which causes video to be displayed on the liquid crystal panel 22 in accordance with the video signal.

The video processing portion 20 includes an OSD processing portion. The OSD processing portion generates OSD data such as characters and symbols specified by a character code included in, for example, digital broadcast signals or OSD data for performing channel display as OSD display information, which is overlapped and output with the video signal.

The video signal demultiplexed by the decoder 13 is also input to a letter-size detecting portion 14. The letter-size detecting portion 14 determines whether the video signal is sent in the letter size. A luminance signal of the video signal demultiplexed by the decoder 13 is detected here, and the luminance signal is compared with a predetermined threshold value to detect a video area lower than the threshold value as a non-video area. If the non-video areas are detected as black belts with a certain width on the upper and lower sides of the video area, it can be determined that the signal is a letter-size video signal. A microcomputer 23 controls a gate portion 15 in accordance with the detection result of the letter-size detecting portion 14 to control the range (screen area) of the video signal output to an APL measuring portion 16 if the input video signal is a letter-size signal. Not only the above luminance level of the video signal but also chromaticity information or color temperature information of the video signal may be used as an index for judging the letter size.

When the letter-size detecting portion 14 detects the letter size, a condition of time axis information may be added to determine that the signal is a letter-size signal when the black-belt-shape non-video areas of the video signal are continuously detected for a predetermined time.

If letter-size information is included in genre information described later, the microcomputer 23 may control the range of the video signal output by the gate portion 15 depending on the letter-size information.

The gate portion 15 selects and extracts a video signal corresponding to a predetermined vertical scanning period and/or a predetermined horizontal scanning period from the input video signal in accordance with the control signal from the microcomputer 23 and outputs the video signal to the APL measuring portion 16.

The microcomputer 23 inputs to the gate portion 15 the control signal in accordance with not only the extracted area based on the above detection result of the letter-size detecting portion 14 but also an extracted area selected in accordance with the genre information of the video signal and an extracted area selected in accordance with the OSD display information. The gate portion 15 selects an area extracted from the video signal in accordance with the control signal defining these extracted areas.

The APL measuring portion 16 measures an APL per frame of the video signal output from the gate portion 15. A measurement area of this APL is a video signal of a certain area extracted by the gate portion 15 as above. If the gate portion 15 does not control the extraction of the certain area, the video signal demultiplexed by the decoder 13 is directly input to the APL measuring portion 16.

The APL measured by the APL measuring portion 16 is sent to a filter 17. The APL corresponds to one of video feature quantities of the present invention and the emission luminance of the backlight light source is controlled depending on the APL based on luminance conversion characteristics of a luminance conversion table described later.

When the backlight luminance is controlled depending on the measurement value of the APL, the filter 17 sets the follow-up ability for changes in the APL of the video signal. The filter 17 is made up of a multistage digital filter, for example.

The filter 17 inputs the APL per frame measured by the APL measuring portion 16 and calculates an output APL by performing a weighted average calculation for each frame with the APL of past one or a plurality of frames in accordance with the weightings thereof. The number of past frame stages reflected in the target frame can variably be set here and the weightings are set for the target frame and each of the past frames (of the set number of stages).

When the APL of the target frame is input, the weighted average calculation is performed for the input APL and the APL of the frames of the number of stages used in the past in accordance with the weightings thereof, and an obtained APL is output. This enables the follow-up ability to be set appropriately for the output APL following the actual changes in the APL.

The number of stages and the weighting values of the filter are set in accordance with the genre code input to the microcomputer 23. The number of stages and the weighting values of the filter 17 can appropriately be set as above and the filter function can be set to be turned on/off.

The APL output from the filter 17 is input to a backlight controlling portion 18. The backlight controlling portion 18 outputs a backlight luminance adjustment signal for adjusting the backlight luminance depending on the input APL based on a selected luminance conversion table 25. The backlight unit 19 controls the emission luminance of the backlight light source in accordance with the backlight luminance adjustment signal output from the backlight controlling portion 18.

As described above, after the APL is measured by the APL measuring portion 16 and the follow-up ability thereof is controlled through the filter portion 15, the APL is input to the backlight controlling portion 18 and used for controlling the emission luminance of the backlight light source. To perform the luminance control of the backlight light source in accordance with the APL, the preliminarily stored luminance conversion table is used in this embodiment. The luminance conversion table (lookup table) defining the emission luminance characteristics of the backlight light source in accordance with the APL may be stored in a table storage memory 24 such as ROM.

Alternatively, a plurality of the luminance conversion tables may be prepared for the respective genres of the display video and may be stored in the table storage memory 24.

In this case, a luminance conversion table stored in the table storage memory 24 is selected based on the genre information demultiplexed from the video signal by the decoder 13 and output or acquired from other routes and is determined as the luminance conversion table 25 used for the backlight luminance control.

The luminance conversion table defines a relation of the emission luminance of the backlight light source depending on the video feature quantity (in this case, APL) of the input video signal. The luminance conversion table used for the control may be selected by preliminarily preparing and retaining a plurality of selectable luminance conversion tables and by specifying a table number to be used depending on the genre information, etc.

Alternatively, when the luminance conversion table is selected and changed, a changed luminance conversion table may be obtained through calculations.

In FIG. 1, a luminance adjustment coefficient is used for setting the brightness of the entire screen depending on user operations. For example, an item for adjusting the brightness of the screen is set in a menu screen retained by the liquid crystal display apparatus 1. A user can manipulate the setting item to set arbitrary screen brightness. The microcomputer 23 of FIG. 1 recognizes the brightness setting and outputs the luminance adjustment coefficient to a multiplier 26 in accordance with the set brightness. The multiplier 26 multiplies the currently used luminance conversion value of the luminance conversion table by the luminance adjustment coefficient to cause the backlight light source to emit light depending on the brightness setting.

The luminance adjustment coefficient changes the slope of the luminance conversion characteristics of the luminance conversion table. That is, when using a luminance adjustment coefficient darkening a screen at a constant rate, the slope of the luminance conversion characteristics is changed in a reducing direction.

The emission luminance of the backlight light source is controlled based on the luminance conversion table 25 selected from the luminance conversion tables stored in the table storage memory 24, and the luminance conversion characteristic value of the luminance conversion table is multiplied by the above luminance adjustment coefficient based on the user setting and is output to the backlight controlling portion 18.

Figure 2:
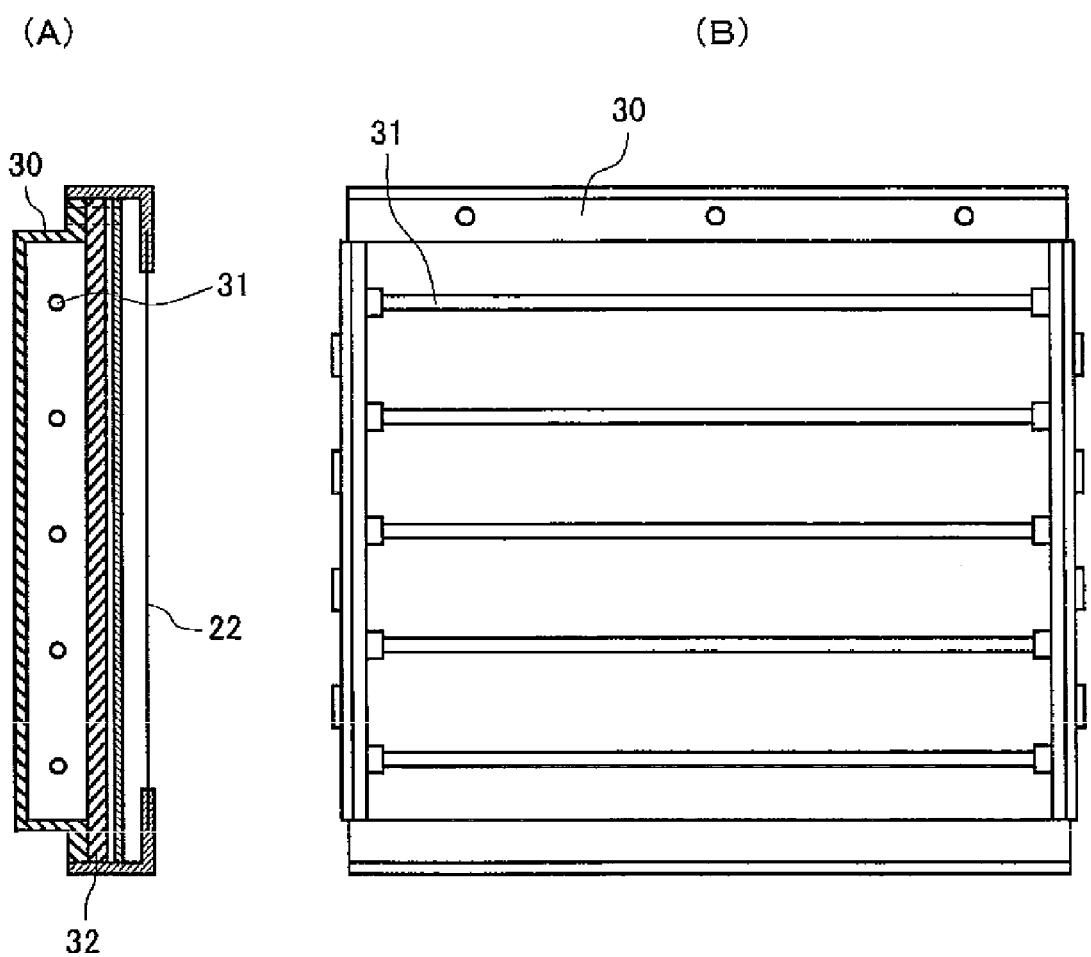
FIG. 2 is a view of an exemplary configuration of a backlight unit applicable to the liquid crystal display apparatus of the present invention.

For example, as shown in FIG. 2, the backlight unit 19 is configured by disposing a plurality of narrow-tube-shaped fluorescent tubes 31 at even intervals within a housing 30 attached to the backside of the liquid crystal panel 22. A diffusion plate 32 equally diffuses the illumination light emitted from the fluorescent tubes 31.

In this case, for example, the backlight unit 19 includes a light modulation control circuit that outputs a light modulation signal, which is pulse-width modulation output having a signal period ratio (duty) of rectangular-wave high-potential and low-potential levels changed in accordance with the backlight luminance adjustment signal input from the backlight controlling portion 18, and an inverter that receives the light modulation signal from the light modulation control circuit to generate an alternating voltage having frequency and voltage corresponding to the light modulation signal and that applies the alternating voltage to the fluorescent tubes 31 to drive the fluorescent tubes 31 to emit light (both not shown). The inverter is operated when the output of the above light modulation control circuit is at a high-potential level and is terminated when the output is at a low-potential level, and the luminance of the light source is adjusted through this intermittent operation depending on the output duty of the light modulation control circuit.

Figure 3:
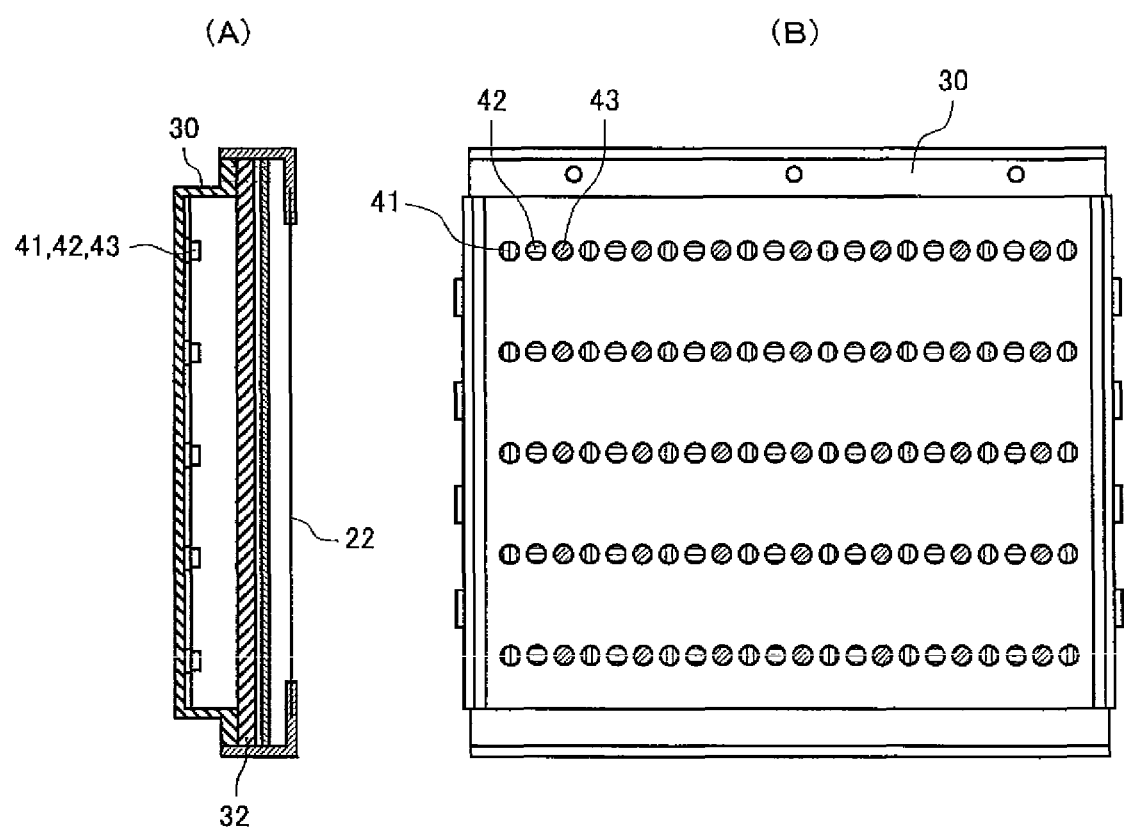
FIG. 3 is a view of another exemplary configuration of the backlight unit applicable to the liquid crystal display apparatus of the present invention.

Alternatively, as shown in FIG. 3, the backlight unit 19 may be configured by disposing LED light sources with a plurality of colors composed of three primary colors of red, green, and blue, i.e., a red light source 41, a green light source 42, and a blue light source 43 within the housing 30 attached to the backside of the liquid crystal panel 22. The emission luminance of the LED light sources may be controlled by LED currents to the respective LED light sources. Although not shown, the above fluorescent tubes and the LEDs may concurrently be used in a mode of those applicable as the backlight unit 17. In this case, the light may be applied to the liquid crystal panel 20 through a so-called side-edge type configuration, which equalizes the light from the light sources such as the fluorescent tubes and the LEDs on a surface with the use of an optical light guide plate.

The liquid crystal display apparatus 1 includes a remote controller light-receiving portion 27 that receives a remote-control control signal transmitted from a remote-control device 29. The remote controller light-receiving portion 27 is made up of a light-receiving LED for receiving a remote-controller operation signal using infrared light, for example.

The remote-controller operation signal received by the remote controller light-receiving portion 27 is input to the microcomputer 23, and the microcomputer 23 performs predetermined control in accordance with the input remote-controller operation signal.

The genre information of broadcast programs is included as a genre code in a portion of the electronic program guide information (hereinafter, "EPG information") overlapped and transmitted with a broadcast signal of terrestrial digital broadcasting or BS/CS digital broadcasting, for example.

The broadcast signal is received by the tuner 12 and is subjected to the decode process by the decoder 13 as above. From this broadcast signal, the genre code is extracted and output as the genre information. The genre information is not limited to be separated and obtained from the broadcast signal tuned by the tuner 12, and for example, when an external device such as a DVD player and a Blu-ray Disc player is connected to the liquid crystal display apparatus 1 to display video information reproduced by the external device on the liquid crystal display apparatus 1, the genre information may be acquired by detecting a flag representing contents (e.g., an identification code indicating "movie") added to a medium such as a DVD.

The broadcast signal is not limited to the digital broadcasting and the content information can also be obtained from analog broadcasting. For example, ADAMS-EPG is the EPG information overlapped and transmitted with the analog broadcasting.

The genre information may be input not only concurrently with the input video signal, but also as sub-information other than the video signal. In this case, if the video signal and the genre information are separately input, the genre information is input in a correlated manner to indicate which video information is indicated by the genre information. For example, XMLTV is an application that automatically acquires a TV program table published on the Web to output the program table in the XML format, and this can be utilized for acquiring the genre information of the display video from a network.

For example, the genre code is defined as the genre information by the terrestrial digital broadcasting standard as shown in FIG. 4. In the example shown in FIG. 4, the genres preliminarily prescribed as major categories are "news/report", "sport", "information/tabloid show", "drama", "music", "variety", "movie", "cartoon/special effects", "documentary/cultural", "stage/performance", "hobby/education", and "others".

A plurality of middle categories is prescribed for each major category. For example, in the major category "sport", middle categories are prescribed as "sport news", "baseball", "soccer", "golf", "other ball sports", "sumo/fighting sport", "Olympics/international convention", "marathon/athletics/swimming", "motor sport", "marine/winter sport", "horse race/public race", and "others". In the major category "movie", middle categories are prescribed as "foreign movie", "domestic movie", and "cartoon" (not shown).

In the embodiment of the liquid crystal display apparatus according to the present invention, an area of the video signal is automatically extracted from the feature of the video signal for measuring the APL to be used, and the APL detected from the video signal in the extracted area is used to control the emission luminance of the backlight light source in accordance with the luminance control characteristics of the luminance conversion table. The APL non-measurement range is a range where the APL measurement is not performed and is set to include additional information such as captions and the OSD display or the black-belt areas generated when displaying letter-size video or performing two-screen display. That is, the intended backlight luminance control may efficiently be performed in accordance with video by measuring the APL only with the effective video area excluding the above additional information and the black-belt areas that may affect the APL measurement.

Figure 5:
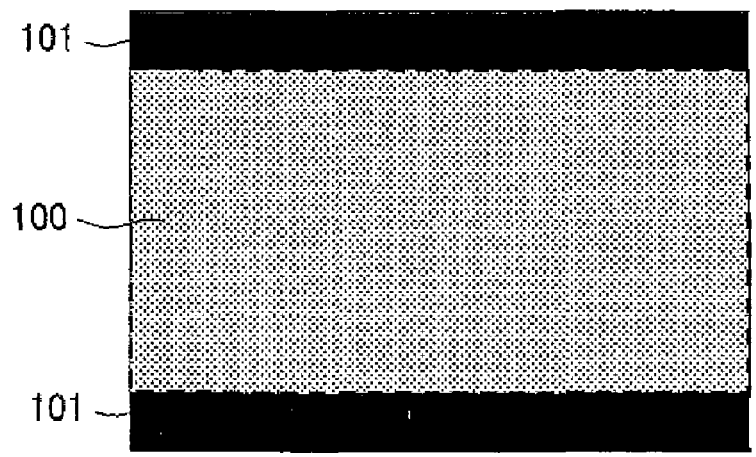
FIG. 5 is a view for explaining exemplary control of an APL measurement area for measuring the APL.

FIG. 5 is a view for explaining exemplary control of an APL measurement area for measuring the APL. In the example shown in FIG. 5, if the video signal is letter-size, the black-belt portions generated as non-video areas on the upper and lower sides of the display screen are defined as APL non-measurement ranges 101, and the APL measurement is performed with an effective video area 100 excluding the APL non-measurement ranges 101.

Whether the video signal is letter-size may be determined from the detection result of the letter-size detecting portion 14 as described above. The letter size may also be identified from a video signal input through another route such as an external device. Alternatively, the letter size information may be identified from the genre information acquired from the video signal.

The microcomputer 23 of the liquid crystal display apparatus 1 controls the gate portion 15 to extracts the area (effective video area 100) excluding the APL non-measurement ranges 101 shown in FIG. 5. The APL measuring portion 16 performs the APL measurement for the video signal of the effective video area 100 extracted by the gate portion.

IL the APL is measured without excluding the black-belt areas included in the letter-size video signal as above, this affects the APL of the video desired to be optimized in brightness, resulting in a value different from the APL of the original video. Therefore, the optimum backlight luminance control can be performed by excluding the black-belt areas of the letter size as the APL non-measurement ranges 101 from the APL measurement area.

Figure 6:
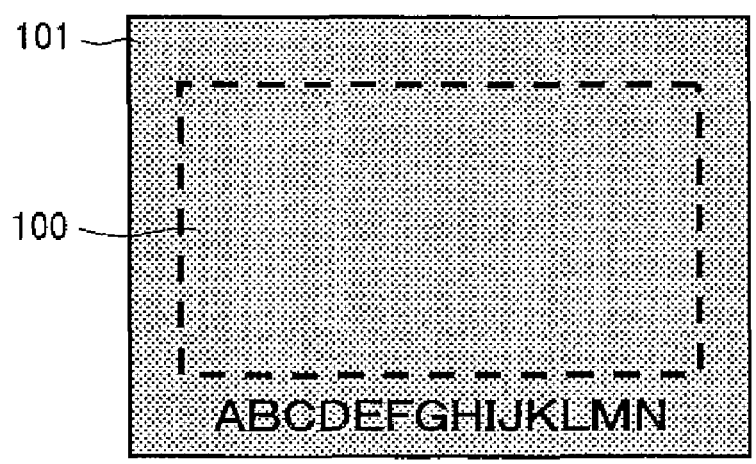
FIG. 6 is a view for explaining another exemplary control of the APL measurement area for measuring the APL.

FIG. 6 is a view for explaining another exemplary control of the APL measurement area for measuring the APL. In the example shown in FIG. 6, it is intended to optimize the backlight control by excluding from the APL measurement area a caption area included in the video signal of the movie genre, for example.

For example, when displaying the video signal having the genre information indicating "movie", the microcomputer 23 of the liquid crystal display apparatus 1 controls the gate portion 15 based on the genre information demultiplexed by the decoder 13 or acquired through another route and indicating "movie" to extract the effective video area 100 excluding the APL non-measurement range 101 shown in FIG. 6. The APL measuring portion 16 performs the APL measurement for the video signal of the effective video area 100 extracted by the gate portion.

As shown in FIG. 6, the video signal of the "movie" genre is likely to have additional information such as captions displayed in the surrounding area on the upper and lower sides or the right and left sides of the video, for example. Such additional information is preliminarily overlapped with the broadcast contents of the movie program.

If the APL is measured with the inclusion of such caption display, this affects the APL of the video desired to be optimized in brightness, resulting in a value different from the APL of the original video. Therefore, as shown in FIG. 6, the optimum backlight luminance control can be performed by excluding from the APL measurement area the area which have additional information such as captions likely displayed as the APL non-measurement ranges 101 in accordance with the genre information (in this case, "movie").

When controlling the APL measurement range for the above "movie" genre, the APL non-measurement ranges 101 as shown in FIG. 6 may be set only when the major category of the video signal genre is "movie"; the middle category is "foreign movies"; and the audio information associated with the video signal is not bilingual to more accurately determine the possibility of captions. This is intended to more accurately exclude only the caption area taking advantage of the fact that the movies having captions displayed are virtually limited to "foreign movies" not having bilingual audio.

Figure 7:
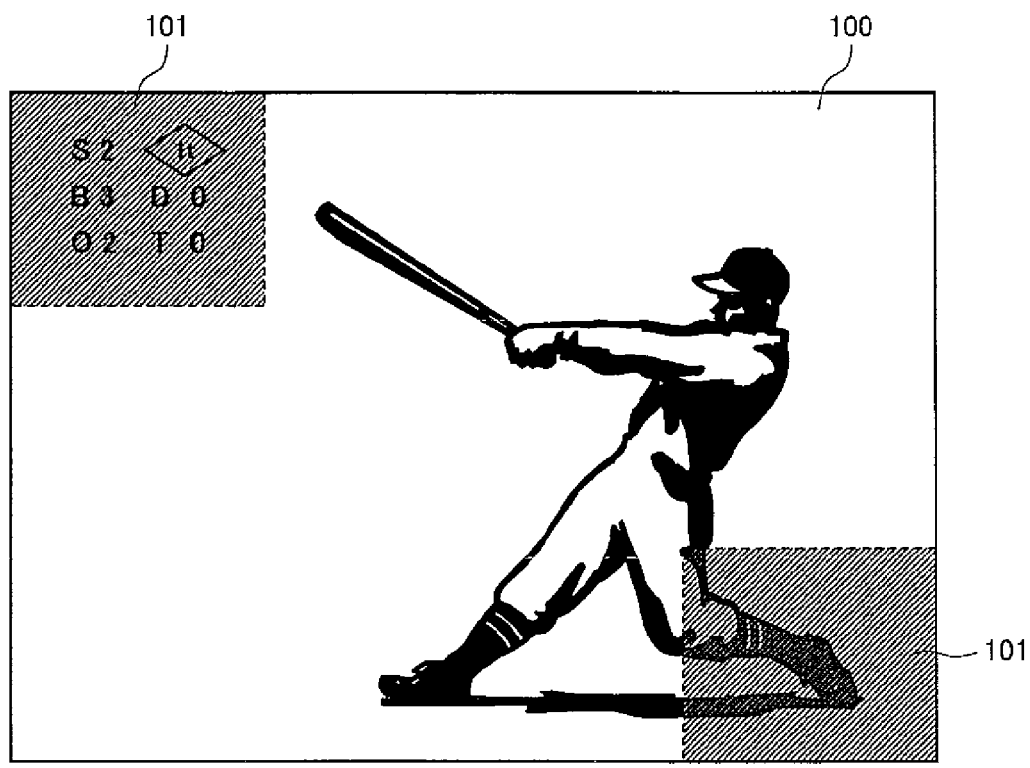
FIG. 7 is a view for explaining yet another exemplary control of the APL measurement area for measuring the APL.

FIG. 7 is a view for explaining yet another exemplary control of the APL measurement area for measuring the APL. In the example shown in FIG. 7, for example, it is intended to optimize the backlight control by excluding from the APL measurement area an additional information area formed by characters and symbols included in the video signal of the baseball genre, for example.

For example, when displaying the video signal having the genre information indicating the major category "sport" and the middle category "baseball", the microcomputer 23 of the liquid crystal display apparatus 1 controls the gate portion 15 based on the genre information demultiplexed by the decoder 13 or acquired through another route and indicating "baseball" to extract the effective video area 100 excluding the APL non-measurement ranges 101 shown in FIG. 7. The APL measuring portion 16 performs the APL measurement for the video signal of the effective video area 100 extracted by the gate portion.

As shown in FIG. 7, the video signal of the "baseball" genre have additional information such as score and count likely displayed in the upper left area of the video, for example. Although not shown in FIG. 7, the additional information such as score is also likely to be displayed in the lower right area of the video. Such information is overlapped and transmitted with the baseball video by the broadcast station broadcasting the baseball program, for example.

If the APL is measured with the inclusion of the additional information such as score and count, this affects the APL of the baseball video actually desired to be optimized in video brightness, resulting in a value different from the APL of the original video. Therefore, as shown in FIG. 7, the optimum backlight luminance control can be performed by excluding from the APL measurement area the area likely to have additional information such as characters and symbols likely displayed as the APL non-measurement ranges 101 in accordance with the genre information (in this case, "baseball").

Figure 8:
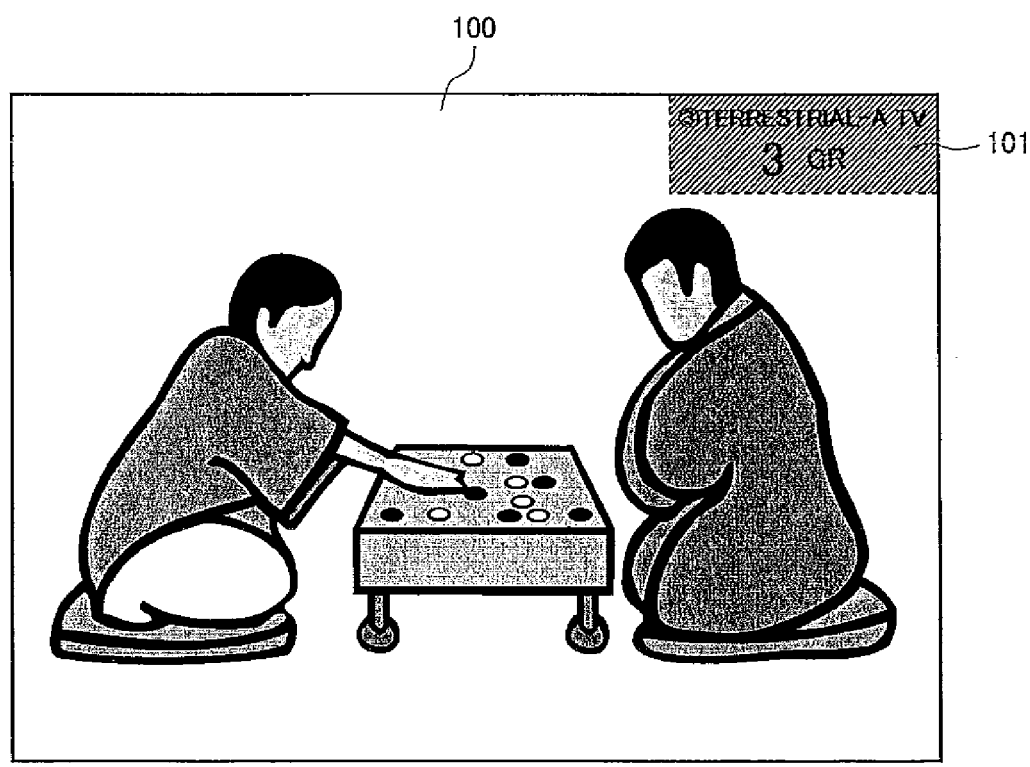
FIG. 8 is a view for explaining yet another exemplary control of the APL measurement area for measuring the APL.

FIG. 8 is a view for explaining yet another exemplary control of the APL measurement area for measuring the APL. In the example shown in FIG. 8, for example, it is intended to optimize the backlight control by excluding from the APL measurement area an additional information area formed by characters and symbols displayed as the OSD information, for example.

For example, when performing the OSD display such as a channel number in accordance with the user operation, the microcomputer 23 of the liquid crystal display apparatus 1 performs the OSD display control instructed through the user operation and controls the gate portion 15 to extract the effective video area 100 excluding the APL non-measurement range 101 shown in FIG. 8. When performing the OSD display control, the microcomputer 23 sets an area including the OSD display as the APL non-measurement range 101. The APL measuring portion 16 performs the APL measurement for the video signal of the effective video area 100 extracted by the gate portion 15.

If the APL is measured with the inclusion of the OSD display by characters and symbols such as channel information, this affects the APL of the video desired to be optimized in brightness, resulting in a value different from the APL of the original video. Therefore, as shown in FIG. 8, the optimum backlight luminance control can be performed by excluding from the APL measurement area the area displaying the additional information such as characters and symbols by OSD as the APL non-measurement range 101.

Figure 9:
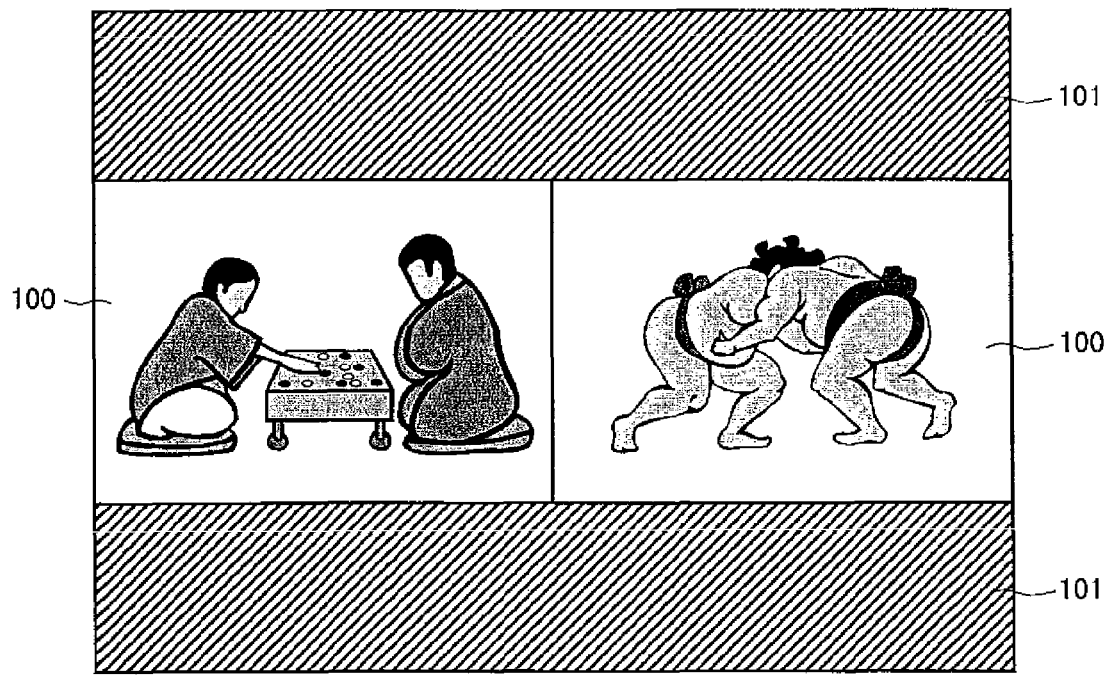
FIG. 9 is a view for explaining yet another exemplary control of the APL measurement area for measuring the APL.

FIG. 9 is a view for explaining yet another exemplary control of the APL measurement area for measuring the APL. In the example shown in FIG. 9, at the time of the two-screen display, the APL is measured in the effective video area excluding black belts inevitably generated as the non-video areas on the upper and lower sides of the display screen.

For example, when performing the two-screen display in accordance with the user operation, the microcomputer 23 of the liquid crystal display apparatus 1 performs control for the two-screen display and controls the gate portion 15 to extract the effective video area 100 excluding the APL non-measurement ranges 101 shown in FIG. 9. When performing the control for the two-screen display, the microcomputer 23 sets the black belt areas on the upper and lower sides displayed with no video as the APL non-measurement range 101. The APL measuring portion 16 performs the APL measurement for the video signal of the effective video area 100 extracted by the gate portion.

If the APL is measured with the inclusion of the non-video black belt areas generated on the upper and lower sides at the time of the two-screen display, this affects the APL of the video actually desired to be optimized in brightness, resulting in a value different from the APL of the original video. Therefore, as shown in FIG. 9, the optimum backlight luminance control can be performed by excluding from the APL measurement area the black belt areas on the upper and lower sides at the time of the two-screen display as the APL non-measurement range 101.

As described above, the effective APL measurement range can be determined by detecting the luminance value level of the video signal to be displayed or by using the genre information or the OSD information of the video signal. As a result, the emission luminance of the backlight light source can be controlled such that the optimum display quality can be obtained depending on the video signal.

The effective APL measurement range may also be determined in another process such as acquiring a program name from the EPG and extracting the characteristics of the program from predetermined keywords to determine a predefined area depending on the characteristics as the APL non-measurement range.

Figure 10:
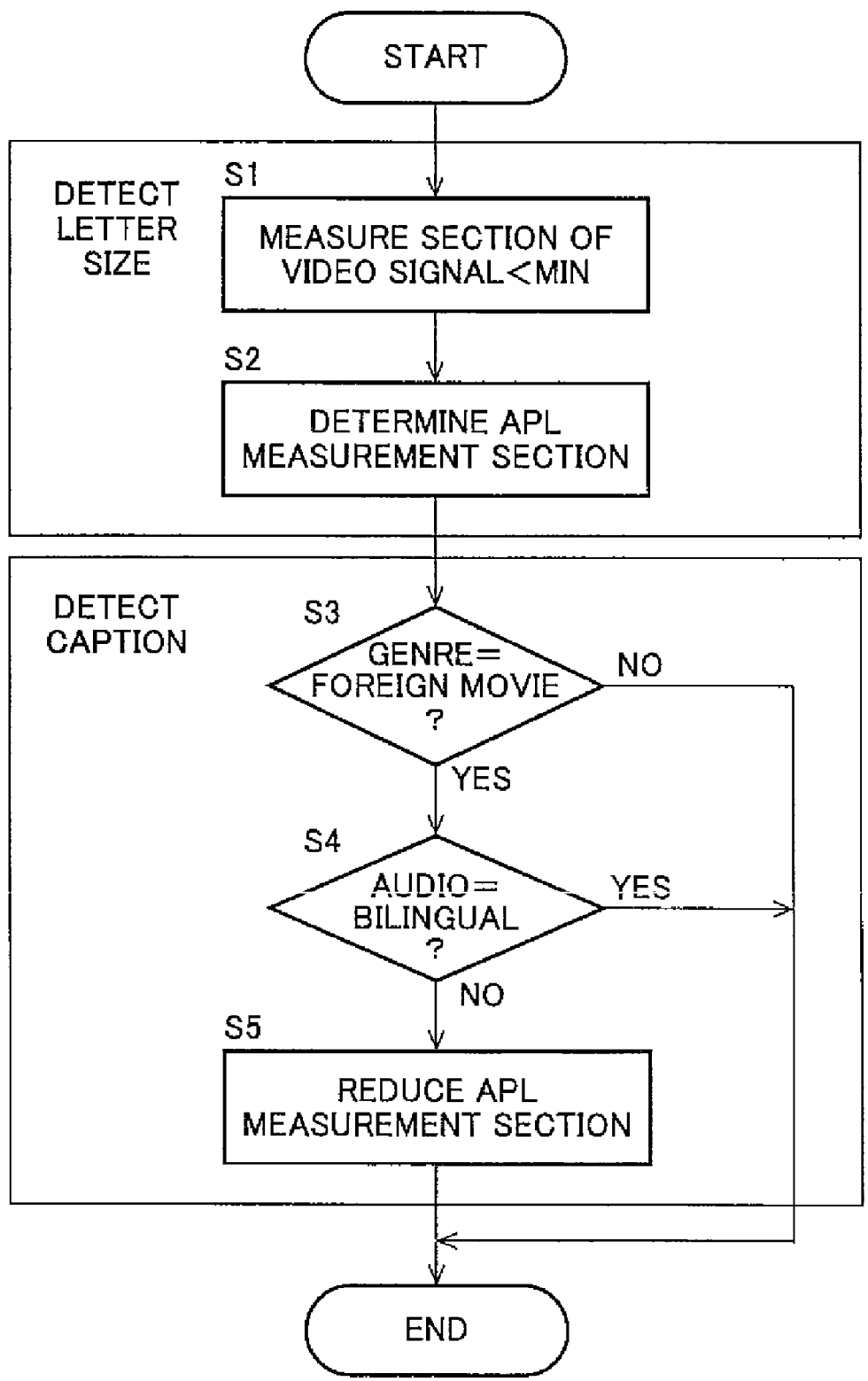
FIG. 10 is a flow chart for explaining an exemplary process when determining the APL measurement area.

FIG. 10 is a flow chart for explaining an exemplary process when determining the API, measurement area.

First, a section of "video signal<MIN" is measured to detect the letter size (step S1). The luminance value of the video signal is compared here with the predetermined MIN to measure the section of the video signal of the luminance lower than the MIN. That is, the MIN can be understood as a threshold value for determining whether the video signal exists.

Based on the measurement result at above step S1, the APL measurement section is determined (step S2). That is, a range for measuring the APL is determined in one frame of the video signal. At the above step, the range of the effective video signal can be determined in the letter-size video signal.

It is then determined whether the genre information of the video signal is "foreign movie" (step S3). The "foreign movie" genre is categorized as a middle category in the major category "movie". If the genre information is not "movie", the APL is measured in accordance with the APL section determined at above step S2.

If the genre information is "movie", it is further determined whether the audio associated with the video signal is bilingual (step S4). If the audio is bilingual, the APL is measured in accordance with the APL measurement section determined at above step S2.

If the audio is not bilingual, the APL measurement section is reduced. In this case, APL measurement section is reduced to exclude the area having additional information such as captions likely to be displayed as shown above in FIG. 6.

Figure 11:
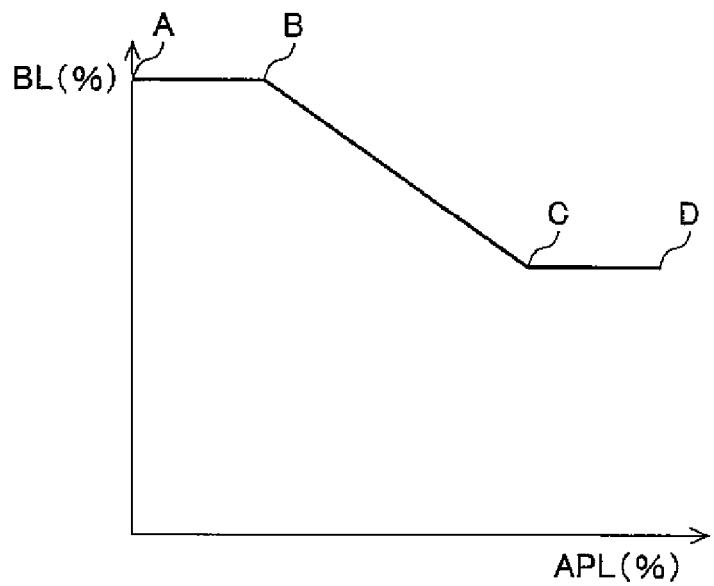
FIG. 11 is a view for explaining an example of the luminance conversion characteristics for controlling the emission luminance of the backlight.

Exemplary setting will then be described for the luminance conversion characteristics of the backlight light source controlled through the luminance conversion table. FIG. 11 is a view for explaining an example of the luminance conversion characteristics for controlling the emission luminance of the backlight light source. The APL is shown in percentage and if the entire screen of the display video is black, the APL is zero. If the entire screen of the display video is white, which has the maximum value, the APL is 100%.

In FIG. 11, the horizontal axis indicates APT (%) which was measured at the APL measuring portion. The vertical axis of FIG. 11 indicates the emission luminance of the backlight light source in percentage, which is 100% when the backlight luminance is maximized and 0% when the backlight light source is turned off.

In FIG. 11, the control characteristics of the backlight light source are changed in accordance with an area with low APL (first APL area) shown between A and B, an area with APL at intermediate levels (second APL area) shown between B and C, and an area with high APL (third APL area) shown between C and D.

In the first APL area (between A and B) where the APL of the input video signal is low, the emission luminance of the backlight light source is set to a constant value at a high level.

Since the low APL area corresponds to dark video, setting high emission luminance in the backlight light source has less effect such as the glare of the screen and the stimulus to the eye. On the other hand, since the peak portion is emphasized in a dark screen, beautiful video can be achieved with the contrast feeling in the low APL area.

In the third APL area (between C and D) where the APL of the input video signal is high, the emission luminance of the backlight light source is set to a constant value at a low level to reduce the effect on the glare of the screen and the stimulus to the eye as much as possible.

The second APL area connecting the above first and third APL areas has slope of a certain level to perform control such that the emission luminance of the backlight light source is reduced as the APL increases. That is, as the detected APL of the video signal becomes higher, the emission luminance of the backlight light source is changed to be smaller, and the glare of the screen and the stimulus to the eye are reduced to display the video with appropriate luminance.

As described above, the backlight light source is controlled to emit light at the maximum luminance level of the luminance conversion characteristics in the first APL area (black side), and the backlight light source is controlled to emit light at the minimum luminance level of the luminance conversion characteristics in the third APL area (white side).

Figure 12:
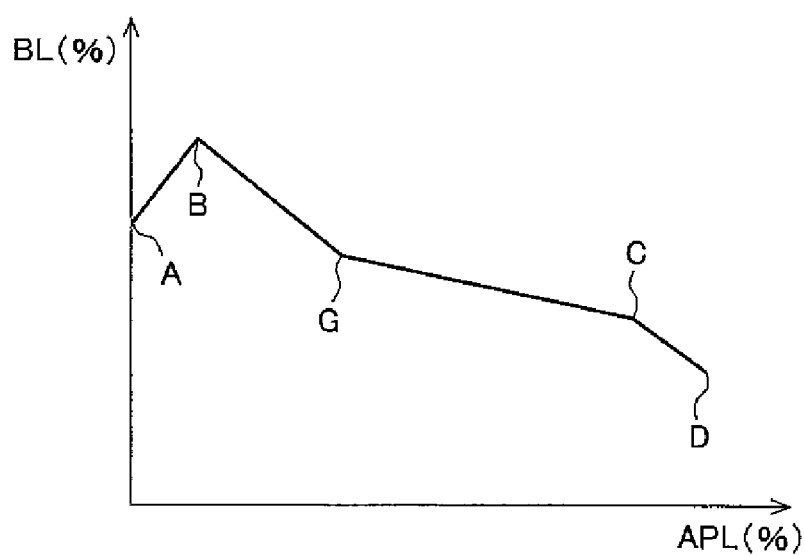
FIG. 12 is a view for explaining another example of the luminance conversion characteristics for controlling the emission luminance of the backlight light source.

FIG. 12 is a view for explaining another exemplary control of the emission luminance of the backlight light source using the luminance control table and shows another example of the shape of the luminance control characteristics applicable to the embodiment.

In the example of FIG. 12, the control characteristics of the backlight light source are changed in accordance with the area with low APL (first APL area) shown between A and B, the area with APL at intermediate levels (second APL area) shown between B and C, and the area with high APL (third APL area) shown between C and D, and a characteristic change point G is provided in the second APL area of intermediate levels to change the slope of the luminance control characteristics.

The luminance control characteristics of FIG. 12 are set with the intention of achieving lower power consumption in the backlight light source while maintaining the quality of the display video. For example, a characteristic change point B closer to the lowest APL of the luminance control characteristics of this example is set at the position where APL is 10%, and a characteristic change point C closer to the highest APL side is set at the position where APL is 90%. The characteristic change point B on the lower APL side is defined as a characteristic change point corresponding to the maximum emission luminance of the backlight.

The signal area of the APL of 10 to 90% includes 95% or more of the broadcasted video signals. In this signal area, the light-source emission luminance is increased at lower APL values (around 10%) to improve the contrast feeling, and the light-source emission luminance is reduced at higher APL values (around 90%) to alleviate undesirable glare feeling, as is the case with the above conventional technology.

That is, in the signal area (area B-C) with the APL of 10 to 90%, the emission luminance of the backlight light source is reduced as the APL increases. The characteristic change point G is also set in this area to change the rate of variation.

In the signal area (area A-B) with extremely low APL of 0 to 10%, the emission luminance is reduced as the APL decreases from the characteristic change point B corresponding to the maximum emission luminance of the backlight light source.

In the signal area (area C-D) with extremely high APL of 90 to 100%, the emission luminance of the backlight light source is further reduced as the APL increases.

In the signal area with extremely high APL of 90 to 100%, the video signal itself has sufficient luminance and it is meaningless to make the backlight light source brighter. Rather, the viewer's eyes may adversely be affected due to the glare feeling from the screen. Therefore, in this signal area, the rate of change in the emission luminance of the backlight light source to the APL can be made larger than the rate of change to the APL in the signal area with the APL of 10 to 90% to reduce the emission luminance of the backlight light source.

With regard to the luminance control characteristics, for example, a CRT (Cathode-Ray Tube) is a typical displaying means and has characteristics that the screen luminance is reduced as the APL increases after the APL exceeds about 50%.

In the above luminance control characteristics, since the emission luminance of the backlight light source is reduced corresponding to the increase in the APL in the signal area with high APL (area C-D) to comply with the luminance characteristics of the CRT, no discomfort is felt when viewing and the image quality is less deteriorated.

As above, the luminance conversion table is used to control the emission luminance of the backlight light source depending on the APL of the video signal.

The backlight luminance is controlled in accordance with the luminance conversion characteristics as above. In this case, the control is performed through the APL value output from the filter 17 and input to the backlight controlling portion 18.

Although the APL is used as a video feature quantity of the input video signal to control the emission luminance of the backlight light source depending on the APL measured in the effective area determined by the microcomputer 23 in the above examples, the video feature quantity is not limited to the APL and, for example, a state of peak luminance (presence or degree) in the effective area determined in one frame of the input video signal may be utilized.

Alternatively, the maximum and minimum luminance levels and the luminance distribution status (histogram) in the effective area of one frame may be used for the video feature quantity of the input video signal, or the emission luminance of the backlight light source may variably be controlled based on a video feature quantity obtained by a combination thereof.

The above luminance conversion control is applicable not only to a direct-view liquid crystal display apparatus as shown in FIG. 2 or 3 but also to a projection type displaying device such as a liquid crystal projector. In this case, the video display is performed by applying the light-source light from the backside of the liquid crystal panel and the emission luminance of the light-source light is controlled in accordance with the above luminance conversion characteristics.

SECOND EMBODIMENT

A second embodiment of the present invention will then be described. Although the display device described in the first embodiment only performs the control such that the emission luminance of the light source is made smaller when the APL of the input video signal increases, it will be described in this embodiment that a video signal process may be added to the light-source control.

Figure 13:
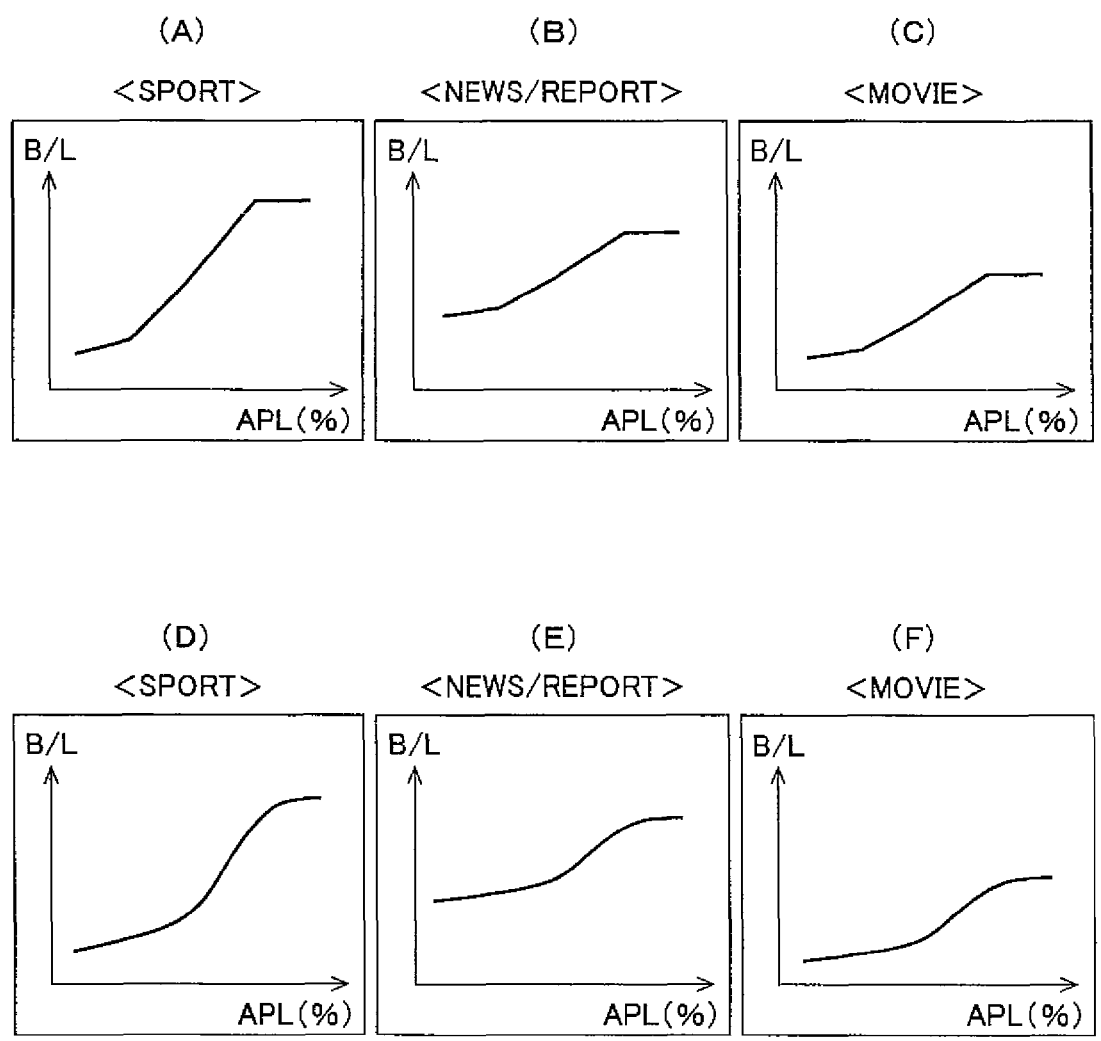
FIG. 13 is a view of an example of a luminance conversion table used when video is displayed with video signals com pressed and extended while the emission luminance of the light source is controlled.

FIG. 13 shows examples of luminance control tables for respective genres (major categories) according to the present invention. Unlike the first embodiment, the luminance conversion characteristics of this embodiment are luminance conversion characteristics that cause the higher emission luminance of the light source when the APL, i.e., the video feature quantity of the input video signal increases. Since it can be said that the video with low APL is generally dark video, this is intended to sufficiently constrain the black level and enhance the contrast feeling by reducing the emission luminance and extending a video signal level to expand the dynamic range when the video is dark. Similarly, for the video with high APL, the video signal level is compressed and the emission luminance of the light source is increased to constrain the generation of white crushing.

The present invention may be applied to those enhancing the contrast feeling of the display video by executing the extension/compression process of the video signal concurrently with the emission luminance control of the light source depending on the feature quantity of the input video signal as above, and in this case, the power consumption can also be reduced while maintaining the contrast feeling by performing the optimum light-source control for each content type.

In the above embodiment, the optimum video representation for each content type can be performed by combining the changes in the gradation conversion characteristics such as gamma correction and contrast correction with the suitable control of the emission luminance of the light source. For example, since movies are the video with low APL, the representation ability in the low gradation portion is enhanced by performing the gradation conversion with the use of the characteristic shown by a curve D of FIG. 14. Since sport is the video with high APL, the representation ability in the high gradation portion is enhanced by performing the gradation conversion with the use of the characteristic shown by a curve E. In the case of news/report, the video may be displayed with the characteristic of a line A of FIG. 14 without the gradation conversion.

If the gradation conversion process is performed for the video signal in this case, the reduction of the number of the representable gradations is caused from the above reason, and therefore, a reference gradation voltage for driving the liquid crystal panel may be varied depending on the input video signal. Specifically, the optimum gamma correction or contrast correction can be performed for each content type by storing a plurality of predetermined reference gradation voltage data and by switching and selecting the data depending on the genre of the video to be displayed.

Figure 14:
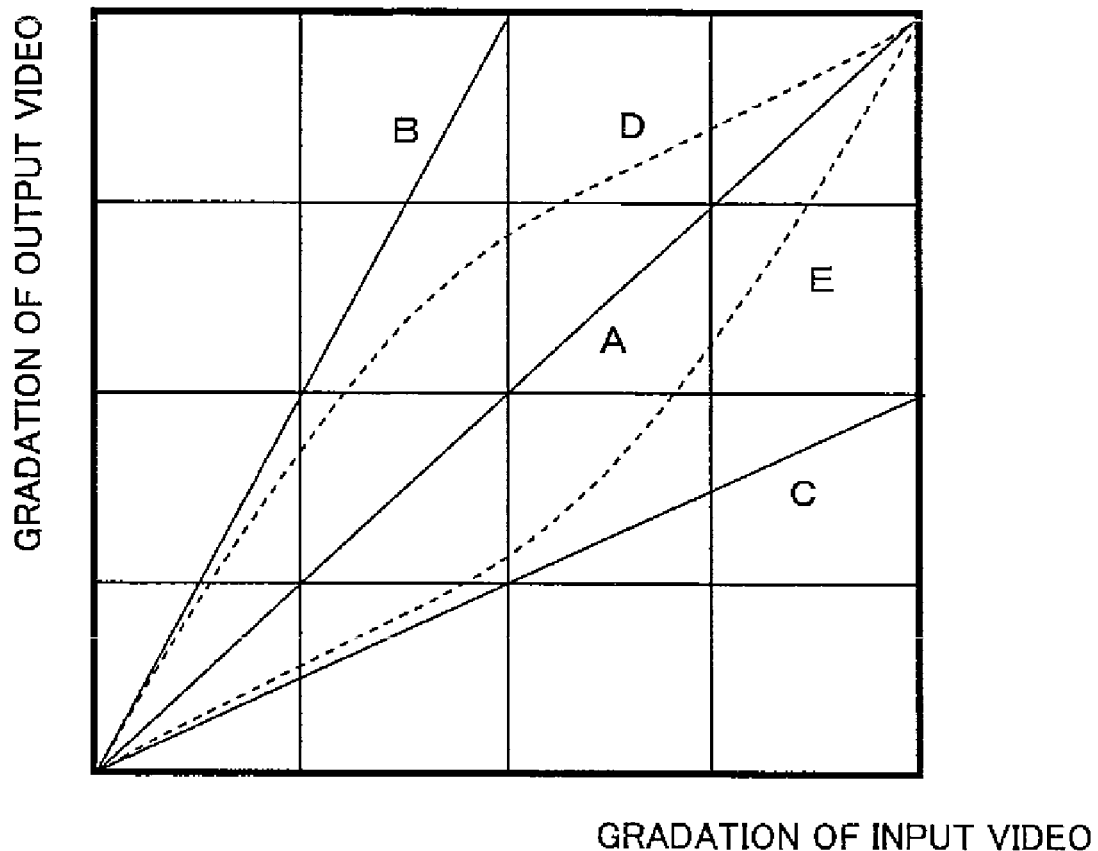
FIG. 14 is a view for explaining gradation characteristics.

In this embodiment, it does not matter whether the luminance conversion characteristics are the linear characteristics such as A, B, and C of FIG. 14 or the nonlinear characteristics such as D and E of FIG. 14.

The invention claimed is:

1. A liquid crystal display apparatus comprising a liquid crystal panel that displays video in accordance with an input video signal and a light source that applies light to the liquid crystal panel, the liquid crystal display apparatus including a controller controlling an emission luminance of the light source based on a feature quantity of the input video signal, the liquid crystal display apparatus further including a genre information obtaining element operable to obtain and provide genre information of the input video signal to the controller, wherein
the controller automatically and variably controls a screen area of the liquid crystal panel displaying the video to exclude a portion of the screen area of the liquid crystal panel not exclusively displaying the video from being used in measuring the feature quantity, the excluded portion of the screen area of the liquid crystal panel is based on the genre information provided by the genre information obtaining element to the controller; and
the excluded portion of the screen area of the liquid crystal panel not exclusively displaying the video is an area for display of at least part of the genre information.

2. The liquid crystal display apparatus as defined in claim 1, wherein the genre information is multiplexed with the input video signal and is obtained by the genre obtaining element by demultiplexing the genre information from the input video signal.

3. The liquid crystal display apparatus as defined in claim 1, wherein the genre information includes information normally displayed in a particular area of the liquid crystal panel and the controller automatically and variably controls the excluded portion of the screen area of the of the liquid crystal panel to correspond to the particular area.

4. The liquid crystal display apparatus as defined in claim 1, wherein the genre information includes a major genre category and a middle genre category that more narrowly defines a sub-category encompassed by the major genre category, and the controller automatically and variably controls the excluded portion of the screen area of the of the liquid crystal panel based on the middle genre category of the genre information.

5. The liquid crystal display apparatus as defined in claim 4, wherein the middle genre category includes information normally displayed in a particular area of the liquid crystal panel and the controller automatically and variably controls the excluded portion of the screen area of the of the liquid crystal panel to correspond to the particular area.

6. The liquid crystal display apparatus as defined in claim 4, wherein the middle genre category includes captions and the controller automatically controls the screen area of the video signal for measuring the feature quantity to exclude a caption area the liquid crystal panel as the particular area of the liquid crystal panel.

7. A method of displaying video on a liquid crystal panel that receives a video input signal including the video to be displayed and a light source that applies light to the liquid crystal panel, the method comprising:
controlling an emission luminance of the light source based on a feature quantity of the input video signal;
obtaining genre information of the input video signal and providing genre information to the controller;
automatically and variably controlling a screen area of the liquid crystal panel displaying the input video signal to exclude a portion of the screen area of the liquid crystal panel not exclusively displaying the video from being used in measuring the feature quantity, the portion of the liquid crystal panel being excluded being based on genre information of the input video signal;
wherein the excluded portion of the screen area of the liquid crystal panel not displaying the input video signal is an area for display of at least part of the genre information.

* * * * *